United States Patent [19]

Rice

[11] Patent Number: 4,696,113

[45] Date of Patent: Sep. 29, 1987

[54] APPARATUS FOR LOCATING THE OUTLINE OF AN ACCESSORY IN DRY WALL OR A DECORATIVE PANEL

[76] Inventor: George Rice, 120 Stevens Dr., Apt. 104, Ypsilanti, Mich. 48197

[21] Appl. No.: 781,344

[22] Filed: Sep. 30, 1985

[51] Int. Cl.[4] .................. G01B 5/14

[52] U.S. Cl. .................. 33/562; 33/197; 33/DIG. 10

[58] Field of Search .................. 33/DIG. 10, 562, 197, 33/180 R, 528

[56] References Cited

U.S. PATENT DOCUMENTS 1,850,616 3/1932 Barnett .................. 33/DIG. 10

2,652,866 9/1953 Drain .................. 33/562 X 3,522,658 8/1970 Howell .................. 33/DIG. 10

4,059,907 11/1977 Dauber .................. 33/DIG. 10

*Primary Examiner*—William D. Martin, Jr.

*Attorney, Agent, or Firm*—Charles W. Chandler

[57] ABSTRACT

A tool for locating an accessory with respect to a vertical wall stud so that an opening can be cut in a panel or sheet of dry wall to accommodate the accessory before the panel is attached to the wall. The method includes tacking a vertical arm to a wall stud adjacent the side edge and either the top or bottom edge of a previously mounted wall panel, and connecting to the vertical arm a horizontal arm with a template located according to the position of the accessory, such as an electrical outlet.

1 Claim, 6 Drawing Figures

APPARATUS FOR LOCATING THE OUTLINE OF AN ACCESSORY IN DRY WALL OR A DECORATIVE PANEL

BACKGROUND OF THE INVENTION

This invention is related to tools for locating an accessory such as an electrical receptacle with respect to a vertical wall stud so that an opening can be formed in a wall panel to accommodate the receptacle prior to the installation of the panel on the wall.

A problem with installing panels or drywall sheets is that frequently the plumbing, electrical and other fixtures have already been installed with outlets extending beyond the wall supporting structure. An opening must be formed in the panel to accommodate such fixtures before the panel is installed. One approach is to measure the height of the fixture with respect to a reference point, and to measure the horizontal distance of the fixture with respect to an adjacent panel, and then to accurately form an outline of the receptacle on the panel so that a hole can be formed to accommodate the receptacle.

One problem with measuring the location for such an opening is that sometimes the user will make an inaccurate measurement or in some cases have difficulty working with numbers so that the hole cut in the panel does not match up with the location of the accessory.

Some fixtures are known in the prior art for locating such receptacles without measuring. For example, U.S. Pat. No. 3,672,064 which issued June 27, 1972 to Johnny C. Elkins, shows an "Indexing Means For Wall Panel Openings." Similarly, U.S. Pat. No. 3,678,588 which issued to Raymond O. Isola, issued July 25, 1972, shows a "Wall Outlet Box Locater".

SUMMARY OF THE INVENTION

The broad purpose of the present invention is to provide a lightweight, easily mounted tool for locating an electrical accessory or plumbing accessory in a wall.

The preferred embodiment of the invention comprises a vertical, channel-shaped aluminum arm having openings at its opposite ends so that the arm can be tacked on the stud to which the panel is to be attached. A horizontal, channel-shaped arm has a collar at one end which embraces the vertical arm. A thumb screw provides means for locking the horizontal arm on the vertical arm at a height accommodating the height of the accessory above the floor. A template is slideably mounted on the horizontal arm, and a thumb screw means provide means for locking the template at a position accommodating the horizontal distance from the vertical arm to the accessory.

Several templates are disclosed for accommodating various plumbing and electrical fixtures.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
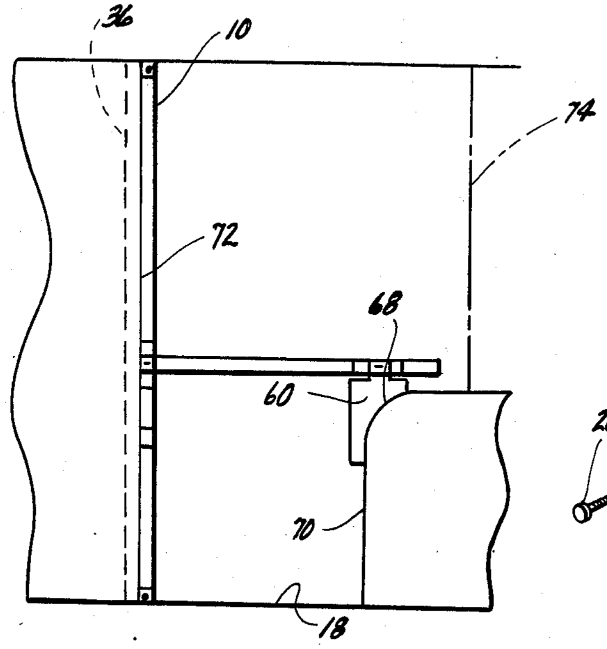
FIG. 1 is a view illustrating the manner in which the tool is mounted on a stud for locating the edge of a bath tub.
Figure 2:
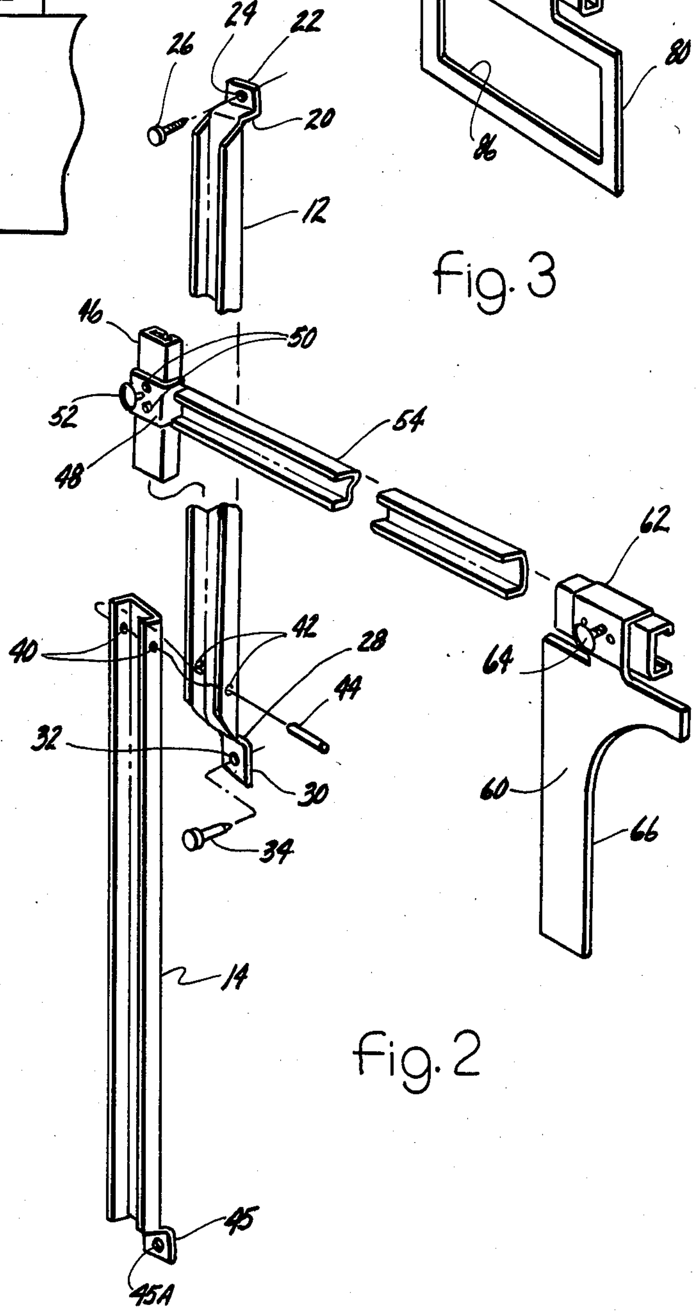
FIG. 2 is an enlarged perspective, partially exploded view of the tool of FIG. 1.

Referring to the drawings, FIGS. 1 and 2 illustrate a preferred tool 10 comprising an upper vertical channel-shaped arm 12 and a lower arm 14 which forms a lower extension of the upper arm. The upper arm can be used independently when there is a shorter distance from floor 18 of the room in which the panel is being installed while the extension is used for an accessory located at a greater height.

The upper arm has its upper end slightly offset as illustrated at 20 with foot 22 having opening 24 for receiving tack 26.

The lower end of the vertical arm also has an offset portion 28 with foot 30 having opening 32 for receiving tack 34. The tacks are employed for attaching arm 12 in a vertical position on a wooden stud, such as at 36, illustrated in FIG. 1. It is to be noted that the cross section of lower arm 14 is slightly smaller than the cross section of the upper arm so that the upper end of the lower arm can be nested in the upper arm. The lower arm has opening means 40 aligned with opening means 42 for receiving pin 44 for locking the two arms together.

The lower end of the lower arm also has an offset foot 45 with a tack-receiving opening 45A.

A channel-shaped, elongated collar 46 is slideably mounted on upper arm 12. A shorter collar 48 is attached by rivet means 50 to the longer collar. Thumb screw 52 is mounted on the two collars to engage upper arm 12 to lock the collar in an adjusted position on the upper arm.

Channel-shaped, aluminum, horizontal arm 54 has one end attached to collar 48.

Template 60 is slideably mounted on the horizontal arm. Template 60 is selected from a group of templates to accommodate the particular accessory that is to be received through an opening in the panel. Each of the templates has a channel-shaped member 62 slideably mounted on horizontal arm 54. Thumb screw 64 is mounted on the channel-shaped member to provide means for locking the template to the arm in an adjusted horizontal position. In this case, template 60 has a contour 66 adapted to engage shoulder 68 of tub 70, as illustrated in FIG. 1.

In use, the upper and lower arms are connected together and tacked on stud 36 adjacent neighboring panel 72 to locate the position of the new panel, illustrated in phantom at 74 being installed edge-to-edge with panel 72. The horizontal arm with template 60 is then adjusted until edge 66 of the template engages tub 70. Thumb screws 52 and 64 are then tightened to lock the horizontal arm in position. The entire locked assembly is then removed from the stud and located on the new panel so that the user can mark panel 74 with the outline of the opening that is to be cut to accommodate the shoulder. The opening is formed and the panel installed in the usual manner.

Figure 3:
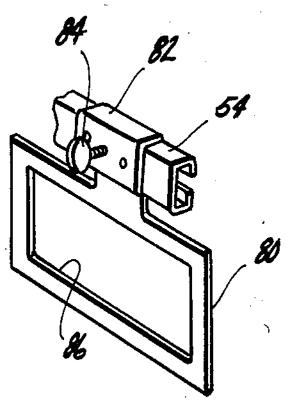
FIG. 3 is a view of an alternative template for accommodating an electrical box.

FIG. 3 illustrates another template 80 which can be mounted on horizontal arm 54, using collar 82 and thumb screw 84. In this case template 80 has a rectangular opening 86 to define the outline of an electrical receptacle box.

Figure 6:
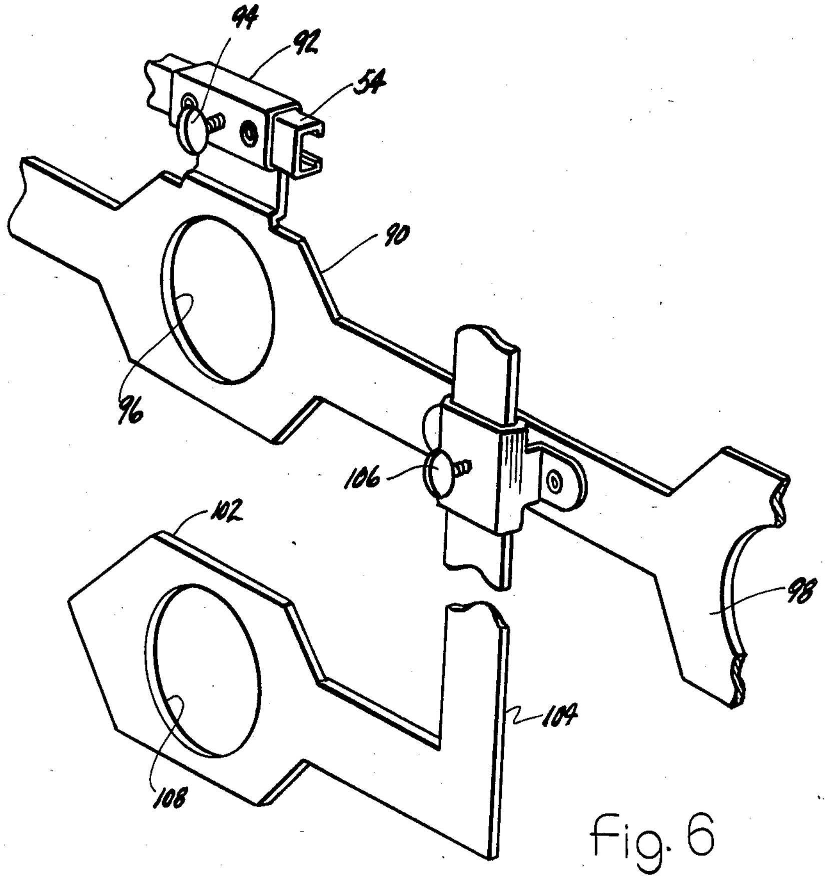
FIG. 6 is a view of a template for accommodating a shower fixture.

FIG. 6 illustrates still another template 90 for defining the location of a hot and cold water shower nozzle. In this case, template 90 has collar 92 slideably mounted on horizontal arm 54 with thumb screw 94 for locking the template on the arm. The template has a main plate-like body with openings 96 and 98 for receiving the hot and cold water faucets. A second template 102 has an arm 104 and thumb screw means 106 for locking template 102 in an adjusted vertical position beneath openings 96 and 98. Template 102 has an opening 108.

Figure 4:
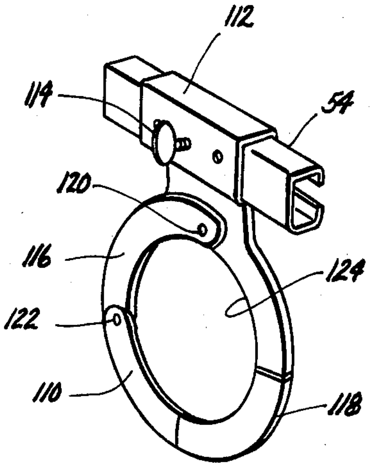
FIG. 4 is a view of a template for accommodating a drain.

FIG. 4 illustrates another template 110 also having a collar 112 slideably mounted on horizontal arm 54 with thumb screw 114 for locking the template in an adjusted horizontal position. In this case the template has a pair of curved arms 116 and 118 connected by pivot means 120 and 122 so that the template can be opened to receive a drain pipe and closed to define the opening 124 necessary to trace the drain pipe opening.

Figure 5:
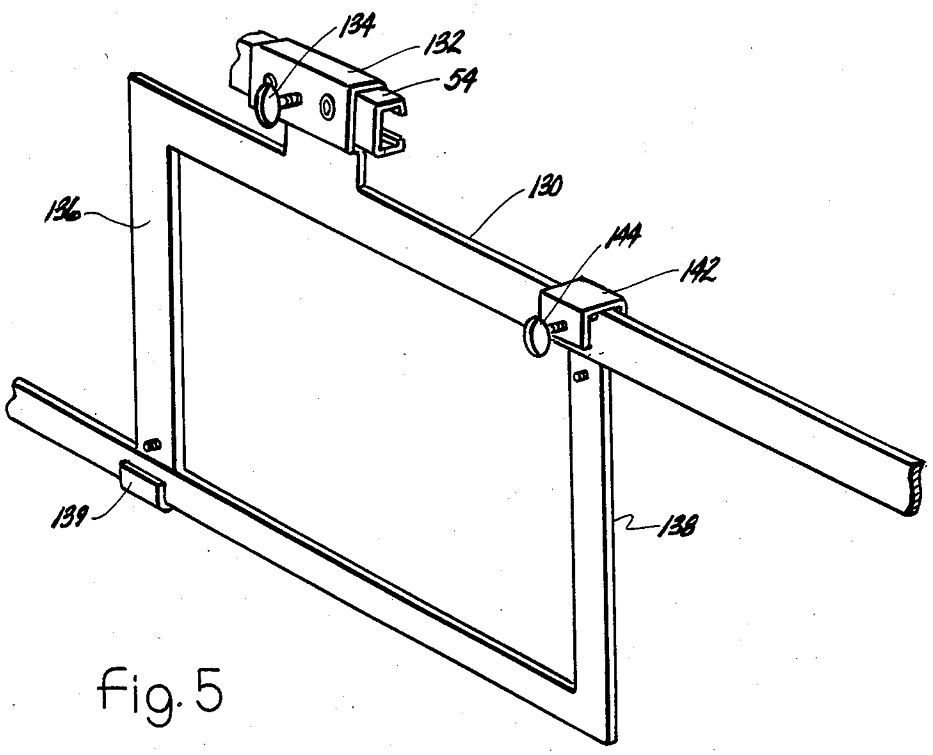
FIG. 5 is a view of an expandable template.

FIG. 5 shows still another template 130 having collar 132 slideably mounted on horizontal arm 54 and thumb screw 134 for locking the template in an adjusted horizontal positon on arm 54. In this case, the template comprises a right angle member 136 having a vertical arm and a horizontal arm. A second right angle member 138 has a horizontal arm slideably received in foot 139 carried on the lower end of the vertical arm of member 136. The upper end of the vertical arm of member 138 has a collar 142 and thumb screw 144 arranged in such a manner that the distance illustrated at "A" can be either increased or reduced to accommodate various size electrical receptacles.

Other forms of templates can be made so that they can be slideably mounted on the horizontal arm to accommodate the contour of other forms of wall fixtures.

Having described my invention, I claim:

1. A method for defining the location of an accessory on a wall with respect to a first panel having a vertical edge attached to a vertical wall stud and transferring the location to a second panel to be mounted on the wall adjacent the first panel, comprising the steps of:

tacking a vertical arm to the vertical wall stud along a line defined by the vertical edge of the first panel such that one end of the vertical arm is adjacent either the upper or lower horizontal edge of the first panel;

locating a horizontal arm, connected to the vertical arm, in a position adjacent the accessory;

locating a template, connected to the horizontal arm, such that the template engages the accessory;

locking the horizontal arm to the vertical arm;

locking the template to the horizontal arm;

removing the locked vertical and horizontal arms and template from the vertical wall stud and mounting same on the second panel such that the vertical arm is mounted along a first edge of the second panel, and said one end of the vertical arm is disposed adjacent a second edge of the second panel so that the template is located in a position on the second panel corresponding to the position of the accessory with respect to the first panel;

forming an outline of the accessory on the second panel;

removing a portion of the second panel defined by said outline to form an opening for receiving the accessory; and installing the second panel on the wall with the first edge of the second panel attached to the stud such that the opening in the second panel receives the accessory.

* * * * *